United States Patent

Frank et al.

Patent Number: 5,150,729
Date of Patent: Sep. 29, 1992

[54] CONTROL SPEAR FOR USE IN A PASSAGE FOR CONDUCTING DUST-CONTAINING HOT GASES

[75] Inventors: Wolfgang Frank, Eschborn; Johannes Löffler, Bad Homburg; Norbert Holle, Friedrichsdorf, all of Fed. Rep. of Germany

[73] Assignee: Metallgesellschaft AG, Frankfurt am Main, Fed. Rep. of Germany

[21] Appl. No.: 774,021

[22] Filed: Oct. 9, 1991

[30] Foreign Application Priority Data

Nov. 16, 1990 [DE] Fed. Rep. of Germany ....... 4036487

[51] Int. Cl.⁵ .............................................. F16K 49/00
[52] U.S. Cl. ........................................ 137/340; 251/86
[58] Field of Search ................... 251/85, 86; 137/340

[56] References Cited

U.S. PATENT DOCUMENTS

| | | | |
|---|---|---|---|
| 2,446,196 | 8/1948 | Sitney | 137/340 |
| 2,479,688 | 8/1949 | Lindgren | 251/86 |
| 3,259,143 | 7/1966 | Powell et al. | 137/340 |
| 3,411,528 | 11/1968 | Katsuhide | 137/340 |

FOREIGN PATENT DOCUMENTS

| | | | |
|---|---|---|---|
| 229099 | 3/1979 | Austria | 251/85 |
| 635739 | 9/1936 | Fed. Rep. of Germany. | |
| 970889 | 11/1958 | Fed. Rep. of Germany. | |
| 1106572 | 5/1961 | Fed. Rep. of Germany | 137/340 |
| 1934454 | 1/1971 | Fed. Rep. of Germany. | |
| 2364385 | 12/1973 | Fed. Rep. of Germany. | |
| 2827527 | 1/1980 | Fed. Rep. of Germany | 251/86 |
| 1797 | of 1871 | United Kingdom | 137/340 |
| 940007 | 10/1963 | United Kingdom. | |

*Primary Examiner*—A. Michael Chambers
*Attorney, Agent, or Firm*—Sprung Horn Kramer & Woods

[57] ABSTRACT

A control spear serves to close and to controllably open a valve passage in a passage for conducting a dust-containing gas at temperatures of about 400° to 1200° C. The control spear comprises a shaft and a frustoconical head which cooperates with the valve passage. The shaft is movably mounted on the head and is preferably resiliently biased against the shaft.

1 Claim, 1 Drawing Sheet

CONTROL SPEAR FOR USE IN A PASSAGE FOR CONDUCTING DUST-CONTAINING HOT GASES

DESCRIPTION

This invention relates to a control spear for closing and for controllably opening a valve passage in a passage for conducting dust-containing gas at temperatures of about 400° to 1200° C.

It is known to control the rate of flow of gases through a line or passage by means of movable flaps. However, such flaps will quickly wear or their movability will adversely be affected by dust-containing hot gases.

For this reason it is an object of the invention to provide a control spear of such kind which will remain operative even under severe conditions.

This object is realized in accordance with the invention by providing a control spear which includes a shaft and an approximately frustoconical head, which cooperates with the valve passage and is movably mounted on the shaft.

The head is preferably mounted to be resiliently biased against the shaft. This can be achieved, e.g., in that the shaft at its end that is adjacent to the head contains a chamber, which houses one end of a stressing bolt extending from the head and a spring, which cooperates with the stressing bolt.

Details of the control spear will be explained with reference to the drawing, in which

DETAILED DESCRIPTION OF THE DRAWINGS

Figure 1:
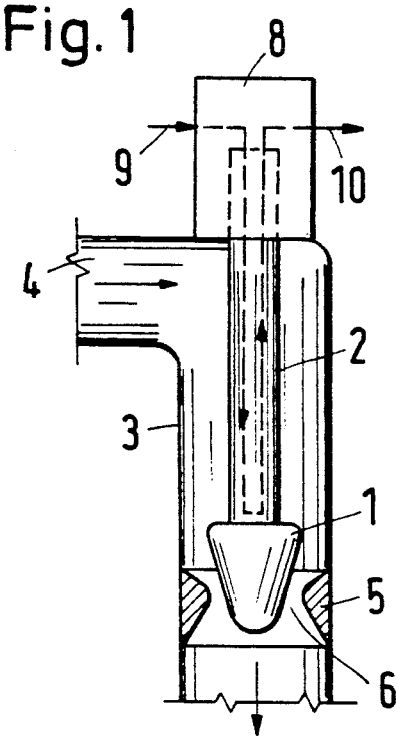
FIG. 1 is a schematic elevation showing the control spear.

The control spear is shown in FIG. 1 to consist of a head 1 and a shaft 2 extending vertically in a passage 3. The passage has a gas inlet 4, through which there are supplied dust-containing hot gases which are at relatively high temperatures in the range from about 400° to 1200° C., preferably of at least 600° C., and which may have a dust content in the range from 50 to 500 g/sm$^3$ (sm$^3$=standard cubic meter) and preferably of at least 100 g/sm$^3$. The gas pressure lies in most cases in the range from 1 to 50 bar and preferably exceeds 10 bar.

The passage 3 contains a seat ring 5, which has an opening that defines circular valve passage 6. That valve passage is closed and is opened to a controllable degree by lowering and raising the control spear so that the head 1 moves adjacent to the valve passage. The head 1 and the seat ring 5 preferably consist of a heat- and wear-resisting material, such as a ceramic material or hardened steel.

Movement is imparted to the control spear by drive means, not shown, disposed in a housing 8. Cooling water is supplied in conduit 9, flows through the shaft 2 and back and is conducted away via the line 10.

Figure 2:
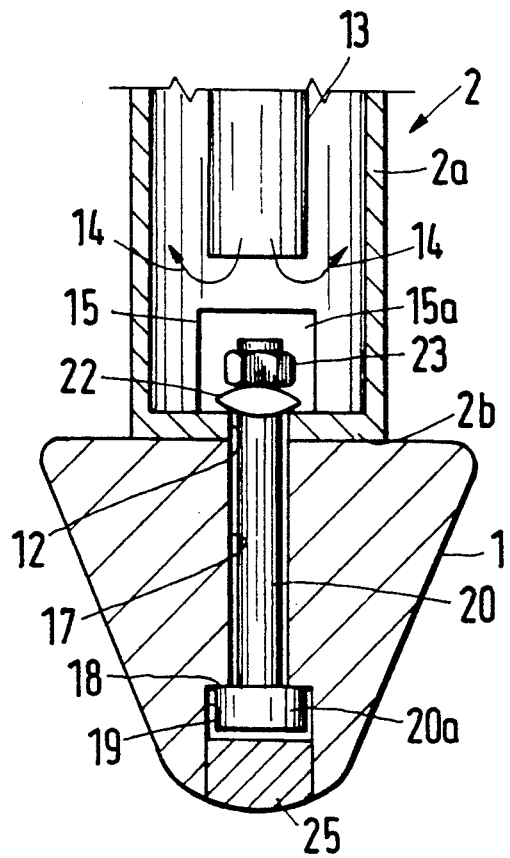
FIG. 2 is a longitudinal sectional view showing the head portion of the control spear.

Details of the head 1 and of the shaft 2 of the control spear will be explained with reference to FIG. 2. The shaft 2 consists of a tube 2a that is provided with a bottom 2b, which has a central bore 12. A cooling water pipe 13 is coaxial to the shaft tube 2a and conducts cooling water from the outside to a location near the bottom end of the shaft, where the cooling water flows out, as is indicated by the arrows 14, and then flows off upwardly in the annular space between the tube 2a and the pipe 13. The cooling water also cools a liquid-tight housing 15, which is provided over the bore 12.

The head 1 of the control spear is approximately frustoconical and is mounted on the shaft 2 to be resiliently biased against the latter so as to have a certain freedom of movement relative to the shaft.

The head 1 has a central bore 17 which at its bottom end merges at a shoulder 18 into an enlarged bore 19 The bore 17 contains a stressing bolt 20 which has an enlarged head 20a bearing against the shoulder 18 and a top end portion that extends through the bore 12. When the stressing bolt 20 has been installed, the enlarged bore 19 is sealed, e.g., by an inserted and adhesively bonded ceramic filler 25.

The top end portion of the stressing bolt 20 is disposed within a chamber 15a that is defined by the housing 15, and that top end portion is provided with screw threads, not shown. A disk spring 22 and a nut 23 are mounted on that screw-threaded portion. The spring 22 is forced by the nut 23 against the bottom 2b of the shaft. Owing to that arrangement, the axes of the head 1 and of the shaft 2 can be displaced slightly relative to each other and may deviate from parallelism so that the passage 3 can be closed quickly when the control spear is lowered because, owing to its freedom of movement, the head will immediately find a fitting position in the valve passage 6, see FIG. 1. That arrangement also permits rotation of the head 1 relative to the shaft 2 about a vertical axis. The head 1 and the shaft 2 may be made of different materials having different coefficients of expansion because they are not rigidly connected.

It will be appreciated that the instant specification and claims are set forth by way of illustration and not limitation, and that various modifications and changes may be made without departing from the spirit and scope of the present invention.

What is claimed is:

1. A control spear for a valve in a passage for conducting dust-containing hot gases, said valve closing and unclosing an opening in said passage, the control spear comprising a shaft and a frustoconical head movably mounted on the shaft, said head being made of ceramic material or hardened steel, said head cooperating with said opening to effect closing and unclosing of the valve, the shaft being hollow and being provided with means for a cooling liquid to flow therethrough, the shaft at its bottom end adjacent to the head being provided with a chamber, the head having a central bore and a shoulder within an enlarged portion of said bore, the bore containing a stressing bolt having an enlarged head bearing against said shoulder, one end of the stressing bolt extending from the head into the chamber, and a disk spring and a nut cooperating with the stressing bolt within said chamber, said spring being forced by the nut against the bottom end of the shaft.

* * * * *